United States Patent [19]

Nagao

[11] Patent Number: 4,939,707

[45] Date of Patent: Jul. 3, 1990

[54] ELECTRONIC WRISTWATCH WITH GENERATOR

[75] Inventor: Shoichi Nagao, Suwa, Japan

[73] Assignee: Seiko Epson Corporation, Tokyo, Japan

[21] Appl. No.: 318,212

[22] Filed: Jan. 25, 1989

[30] Foreign Application Priority Data

Jan. 25, 1988 [WO] PCT Int'l Appl. ... PCT/JP88/00052

[51] Int. Cl.[5] ......................... G04B 1/00; H01M 10/46

[52] U.S. Cl. ....................................... 368/64; 368/204; 320/21

[58] Field of Search ............. 368/64, 76, 80, 203–204; 310/7 SR, 7 SA, 156, 37; 320/2, 21, 41, 42, 61; 322/1, 3, 4, 10

[56] References Cited

U.S. PATENT DOCUMENTS

| | | | |
|---|---|---|---|
| 3,984,972 | 10/1976 | Yoshino | 368/156 |
| 4,091,302 | 5/1978 | Yamashita | 368/204 |
| 4,644,246 | 2/1987 | Knapen | 368/64 |
| 4,653,931 | 3/1987 | Takeda | 368/205 |

FOREIGN PATENT DOCUMENTS

| | | | |
|---|---|---|---|
| 2751797 | 5/1979 | Fed. Rep. of Germany | 368/204 |
| 38-7848 | 6/1963 | Japan . | |
| 42-9273 | 5/1967 | Japan . | |
| 46-2677 | 1/1971 | Japan . | |
| 52-67365 | 3/1977 | Japan | 368/204 |
| 52-16270 | 7/1977 | Japan | 368/204 |
| 52-82480 | 7/1977 | Japan . | |
| 62-69190 | 3/1987 | Japan . | |

*Primary Examiner*—Vit W. Miska
*Attorney, Agent, or Firm*—Blum Kaplan

[57] ABSTRACT

An electronic wristwatch having an electric generator contained internally therein is provided. The generator converts energy from mechanical to electrical energy to drive the electronic wristwatch. The oscillation of an oscillating weight produces mechanical energy as it oscillates. A wheel train transmits the mechanical energy to the generator by applying a torque to the generator. A limiter prevents transmission of mechanical energy through the wristwatch when the torque to be applied to the generator exceeds a predetermined value and allows the mechanical energy to be transmitted when the torque to be applied to the generator is less than or equal to the predetermined value.

23 Claims, 4 Drawing Sheets

FIG. 4
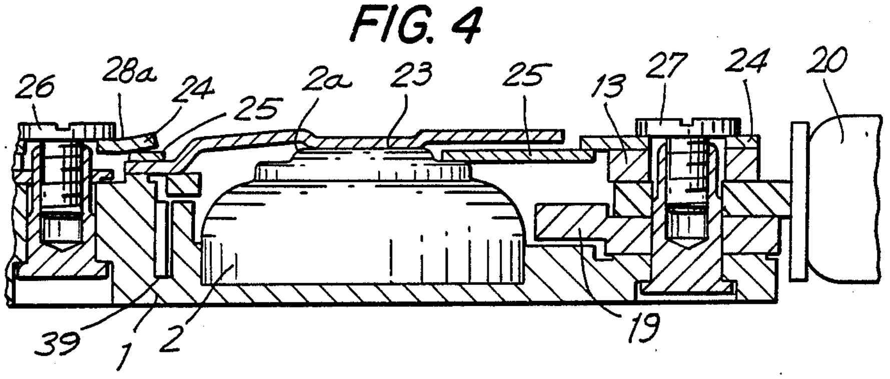
FIG. 4a
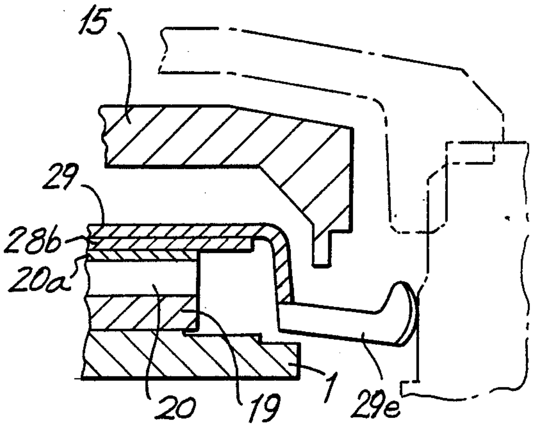
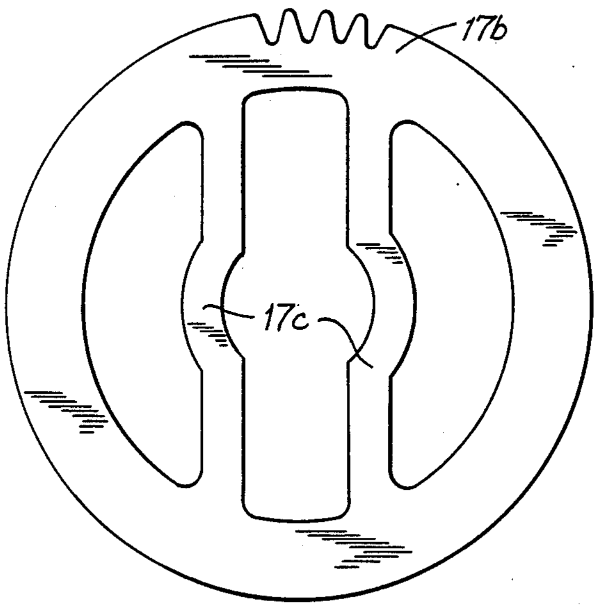
FIG. 5

ELECTRONIC WRISTWATCH WITH GENERATOR

BACKGROUND OF THE INVENTION

The invention relates to a wristwatch including a generator capable of converting mechanical energy to electrical energy, and more particularly, to a wristwatch having an oscillating weight and a permanent magnet rotor which is rotated by the oscillation of the oscillating weight so that induced voltage is generated in a coil and stored in an accumulator which provides an output to a watch circuit.

Electronic wristwatches are well known in the art and come in several different categories. A first such wristwatch utilizes batteries to power the time keeping structure. A great concern of watch manufacturers has been extending the lifetime of the batteries. One way to increase battery life is to use larger batteries. However, due to the inherent small size of the wristwatch, battery size is limited.

To overcome this problem solar batteries have been utilized in electronic wristwatches. A solar battery is provided on the display face of the watch. A secondary battery or a charging capacitor is charged by the solar battery to drive a clock circuit as shown in U.S. Pat. No. 4,653,931. These watches have been satisfactory, however, they suffer from the limitation that a black or blue solar battery is positioned on the face or dial severely limiting the watch design. This is not pleasing to purchasers who buy watches for aesthetic value.

Another type of watch includes a mechanical actuating member such as an oscillating weight housed within the watch. A permanent magnet rotor contained within the watch is rotated by movement of the mechanical actuating member to generate electrical power. This watch has also been satisfactory, however, because of the size of the generator itself increases with the need for more power obtaining additional power for the wristwatch has not yet been perfected.

Accordingly, it is desirable to provide an electronic wristwatch with an electric generator which overcomes the shortcomings of the prior art devices described above.

SUMMARY OF THE INVENTION

Generally speaking, in accordance with the invention, an electronic wristwatch having a generator which can change mechanical energy to electrical energy includes an oscillating weight supported within the watch. A power transmission train transmits the power from the oscillating weight to the generator. The power transmission train includes a friction coupled portion which is arranged to slip upon itself when a torque applied along the transmission train corresponding to the mechanical energy obtained from the oscillating weight is greater than a predetermined value.

The power transmission train may include a gear wheel train. The generator may include a permanent magnet rotor driven by the gear wheel train. A coil is magnetically connected to the rotor to generate the induced voltage in response to rotation of the rotor. The oscillating weight is pivotally supported in a central portion of the coil and rotor and in the center of the wristwatch and includes an outer periphery disposed outside the coil coplanar with the coil.

The wristwatch may also include an indicating gear wheel train to control the indication of the wristwatch. The indicating wheel train is driven by a step motor, stator and coil. A circuit board is arranged to output a signal for driving the step motor and control the charge of the output from the generator's coil. The indicating gear wheel train, the transmission gear wheel train, the wristwatch indication coil, the generator coil and circuit board are disposed in a dispersed arrangement throughout the wristwatch so that these elements do not substantially overlap each other to provide a mechanical structure of thin size in which an oscillating weight is pivotally disposed on the obverse side of the mechanical structure.

Accordingly, it is an object of the invention to provide an improved electronic wristwatch having an electric generator.

Another object of the invention is to provide an electronic wristwatch having an electric generator therein which is constructed of a thin size and has superior charging efficiency.

A further object of this invention is to provide an electronic wristwatch having an electric generator therein including a slip mechanism to prevent damage even when external impact is applied to the wristwatch.

Yet another object of the invention is to provide a small sized wristwatch having a generator which resists high impact forces to the watch.

Still other objects and advantages of the invention will in part be obvious and will in part be apparent from the specification and the drawings.

The invention accordingly comprises features of construction, combinations of elements and arrangements of parts which will be exemplified in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a fragmented sectional view of the electronic wristwatch of FIG. 1;

FIG. 5 is a top plan view of a transmission wheel gear constructed in accordance with the invention;

DETAILED DESCRIPTION OF THE PREFERRED EMBODIMENT

Figure 1:
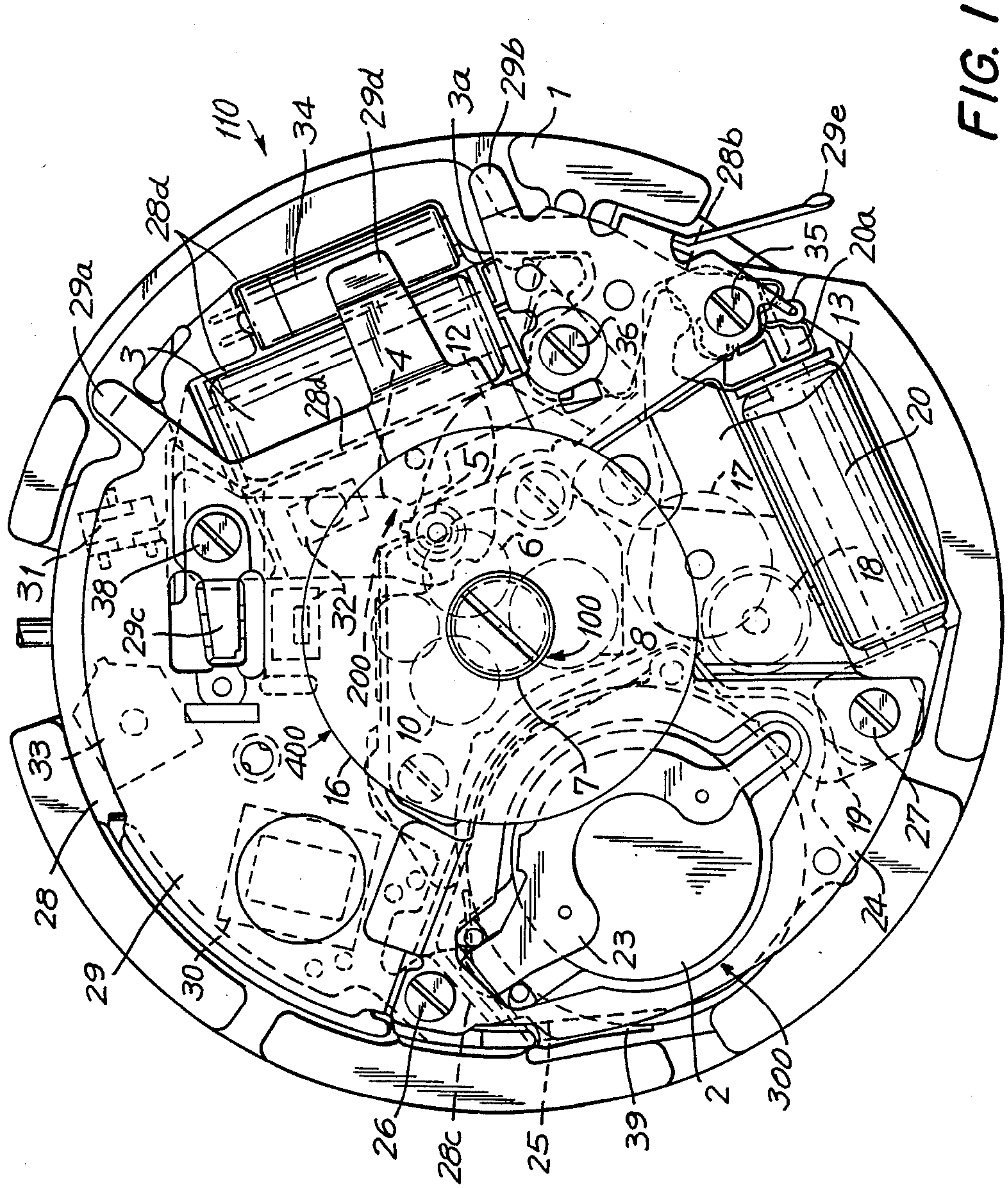
FIG. 1 is a top plan view of an electronic wristwatch constructed in accordance with the present invention.

Reference is first had to FIG. 1 in which a wristwatch, generally indicated at 110, constructed in accordance with the invention is provided. Wristwatch 110 includes a main plate 1. A time indicating gear wheel train 100, a stepping motor 200, an accumulator 300, a generator 400 and a circuit board 28 are all supported on the upper surface of main plate 1.

Figure 2:
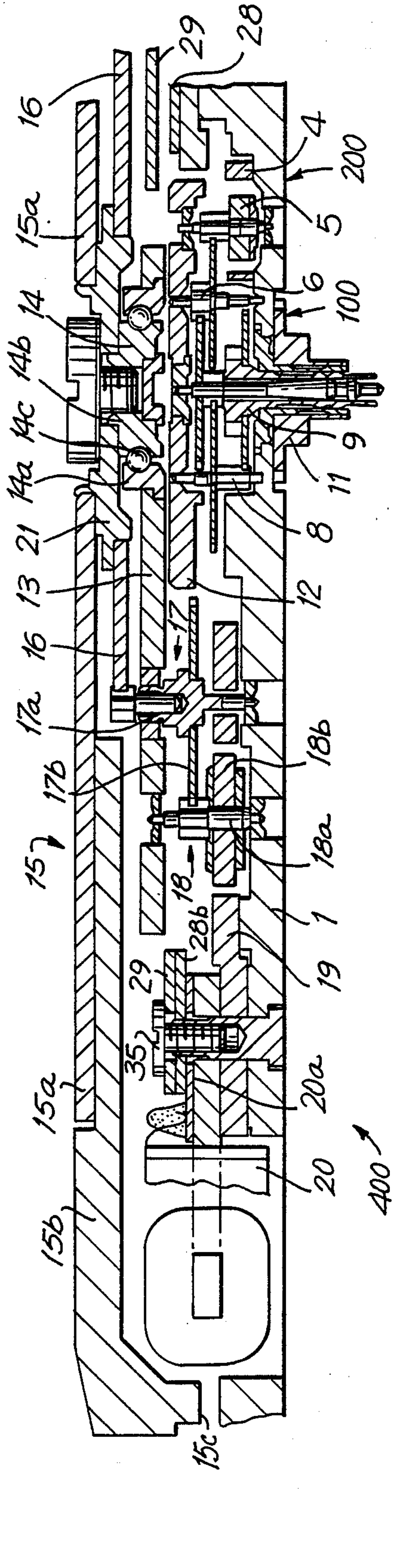
FIG. 2 is a fragmented sectional view of the electronic wristwatch of FIG. 1.
Figure 3A:
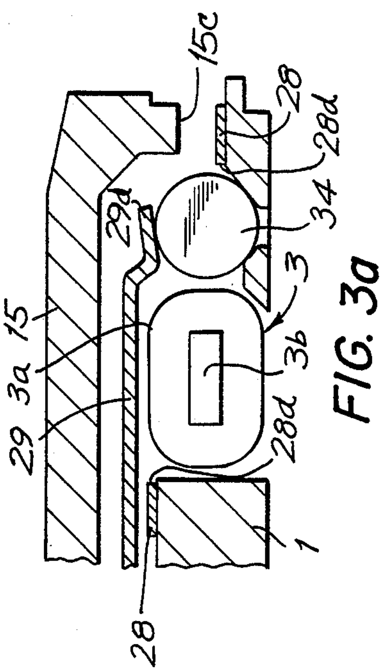
FIG. 3 is a fragmented sectional view of the electronic wristwatch of FIG. 1.
Figure 3:
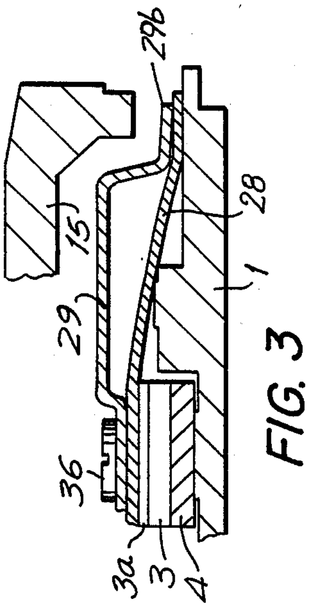

Reference is now also made to FIGS. 2, 3 and 4 in which sectional views of wristwatch 110 are provided. Time indicating gear wheel train 100 includes an intermediate wheel 6, a second wheel 7, a third wheel 8, a center wheel 9, a minute wheel 10 and an hour wheel 11 which are meshed in series and supported on main plate 1. A train wheel bridge 12 rotatably supports the obverse side of each wheel of indicating gear wheel train 100, so that gear wheel train 100 is rotatably supported between train wheel bridge 12 and main plate 1. Step motor 200 includes a coil block 3, a plate shaped stator 4 and a permanent magnet rotor 5. Permanent magnet rotor 5 meshes with intermediate wheel 6 to drive indicating gear wheel train 100. Coil block 3 includes a coil 3*a* and a core 3*b* extending through coil 3*a*. Coil block 3 is disposed at a distance separated from train wheel bridge 12 so as to not overlap with train wheel bridge 12 thereby preventing an increase in thickness of the train wheel section of wristwatch 110.

As can be seen in FIG. 2 generator 400 includes an oscillating weight bridge 13 which is disposed on the upper side of train wheel bridge 12. An oscillating weight 15 is pivotably supported on oscillating weight bridge 13 by a bearing 14. An oscillating weight wheel 16 is integrally secured to oscillating weight 15 as a unitary piece. A transmission wheel 17 meshes with oscillating weight wheel 16 so that transmission wheel 17 rotates with oscillating weight wheel 16. Transmission wheel 17 meshes with a permanent magnet rotor 18 causing permanent magnet rotor 18 to rotate. Permanent magnet rotor 18 interacts with a stator 19 for generating electrical energy in cooperation with a generator coil block 20 disposed about permanent magnet rotor 18. Oscillating weight 15 includes an oscillating weight body 15*a* and oscillating weight member 15*b* which are welded together to form an integral unit.

An oscillating weight wheel spindle 21 is rigidly affixed to bearing 14 and is secured to oscillating weight body 15*a* at an upper end portion of oscillating weight wheel spindle 21. Oscillating weight body 15*a* is affixed to oscillating weight wheel spindle 21 by caulking. Oscillating weight wheel spindle 21 is also rigidly secured at its lower end to oscillating weight wheel 16.

Bearing 14 is of a type known in the art and includes an outer ring portion 14*a* originally secured to oscillating weight bridge 13. An inner ring portion 14*b* of bearing 14 is rigidly secured to oscillating weight wheel spindle 21. Balls 14*c* are disposed between inner ring portion 14*b* and outer ring portion 14*a*. Transmission wheel 17 includes a transmission wheel spindle 17*a* having a pinion and a transmission gear wheel 17*b* which is connected to transmission wheel spindle 17*a* by a friction fit. Permanent magnet rotor 18 includes a rotor spindle 18*a* having a pinion and a permanent magnet 18*b*. Permanent magnet rotor 18 is formed to be flat with a view to increasing the generation efficiency.

Transmission wheel 17 and generator rotor 18 are rotatably supported between main plate 1 and oscillating weight bridge 13. Coil block 20 is disposed so that it is separated from oscillating weight bridge 13 so as not to overlap oscillating weight bridge 13 preventing any increase in the thickness of watch 110. As is clearly seen in FIG. 1, transmission wheel 17 and permanent magnet rotor 18 constitute in combination a generation wheel train and are disposed in a dispersed pattern so as not to overlap indicating wheel train 100. Indicating coil block 3 and generator coil block 20 are also disposed in a dispersed pattern at the outer periphery of main plate 1 with a view to minimizing watch thickness.

Experiments have shown that charging efficiency is increased when the ratio of the rotor diameter $R_d$ to rotor thickness is set at a range between 0.05 to 0.5 and is it best when falling within the range from 0.1 to 0.3. The rotor magnet is formed using a rare earth magnet. In an exemplary embodiment this rare earth magnet is made of $Sm_2Co_{17}$; or the like which is light and has a high magnetic flux density. The magnet is magnetized so as to have two magnetic poles. However, the number of magnetic poles for the rotor magnetic may also be six, eight or the like.

Generator 400 operates when oscillating weight 15 oscillates. Oscillating weight 15 rotates oscillating weight wheel 16. Oscillating weight wheel 16 and transmission wheel 17 cause rotor 18 to rotate with an increased speed thereby generating an induced voltage in coil block 20. A capacitor 2 acts as a voltage accumulator through a circuit described in greater detail below and stores the induced voltage. Because oscillating weight 15 readily oscillates from the natural arm swings occurring when the user carries the wristwatch, satisfactory charging becomes available.

Experiments have shown that the speed increasing ratio of oscillating weight 15 to rotor 18 should be set within a range from about 30 to 200. It should be noted that stator 19 is arranged as a uniform one piece stator because if stator 19 were formed as a two piece stator as described, for example in U.S. Pat. No. 3,984,972 the attractive force acting between the rotor and the stator would increase, acting as a break on the oscillation of oscillating weight 15. A two piece stator may be employed if the parameters were strictly set.

Watch manufacturers are concerned that wheel support portions of the power transmission wheel train and the teeth of the wheels themselves may be damaged when a strong impact load torque is applied to the oscillating weight due to a high oscillation load such as when the watch is dropped. The prior art generators suffer from a problem that they are inferior in terms of impact resistance. Accordingly, to improve the impact resistance of a wristwatch the strength of each individual part could be increased to withstand an impact force. However, an increase in the strength necessitates increase in the size of the internal structure so that it becomes difficult to utilize such a generator in a small sized product such as a wristwatch.

Therefore, wristwatch 110 is provided with a power transmission gear wheel train linked to oscillating weight 15 which has at least one portion which transmits power generated by oscillating weight 15 through a section bound by frictional forces. Therefore when a strong impact load torque is applied to oscillating weight 15, for example, when the watch is dropped, that portion of the power transmission gear wheel train will slip upon itself thus preventing strong impact load torque from being transmitted downstream of the friction coupling in the power transmission gear wheel chain.

Specifically, transmission wheel spindle 17*a* is coupled to transmission wheel gear 17*b* by a friction fit. As can be seen more clearly in FIG. 5, resilient arm 17*c* extends across the inner diameter of transmission wheel gear 17*b*. Resilient arms 17*c* frictionally attach to transmission wheel spindle 17*a*.

The frictional force between transmission gear wheel **17*b* and transmission wheel spindle 17*a* is set in accordance with an operational relationship. During normal operation power must be transmitted without transmission gear wheel 17*b* slipping within transmission wheel spindle 17*a*. To prevent slippage and loss of transmitted power, a friction force level should be set so as to be higher than the load component applied by the magnetic force produced between rotor 18 and stator 19 and a mechanical load such as friction occurring within the transmission train wheel section. However, when an impact is applied to the watch the speed of rotation of rotor 18 increase and the load applied by the magnetic force between rotor 18 and stator 19 increases due to electromagnetic induction. Therefore, the level of friction force between transmission gear wheel 17*b* and transmission wheel spindle 17*a*** should be set at a level lower than magnetic force load applied during impact and the mechanical load applied during impact.

Actually these values may be obtained by setting a lower limit for the friction force so that the lower limit value which is inverted into a torque on the basis of the gear ratio overcomes the unbalanced torque of the oscillating weight. In an exemplary embodiment when the unbalanced torque of the oscillating weight is W g·cm and the number of teeth in oscillating weight wheel 16 and transmission wheel spindle **17*a* are $Z_1$ and $Z_2$ respectively, the frictional force between transmission wheel gear 17*b* and transmission wheel spindle 17*a*** should be set so that it is greater than $W \times (Z_2/Z_1)$. With the above relationship, when the watch is gently carried in normal use an acceleration of only about 1G acts on the oscillating weight and therefore there is no slippage. The upper limit for the friction force should be set so as to be lower than the mechanical strength at the tenon, teeth and the like of each wheel.

In the above described arrangement, when a watch is carried in its normal state, the level of the friction force is higher than the torque of oscillating weight 15 generated by arm motion or the like. Therefore, transmission wheel gear **17*b* transmits substantially the entire mechanical energy of oscillating weight 15 to rotor 18, without any loss of transmitted power due to slippage. However, when a strong impact is applied to oscillating weight 15, for example when watch 110 is dropped, the torque of oscillating weight 15 exceeds the friction force within transmission wheel 17 so that transmission spindle 17*a* slips within transmission wheel gear 17*b* and the oscillation of oscillating weight 15 is not transmitted downstream of transmission wheel 17**.

It should be noted that the position of the frictional engagement within the power transmission train may be set on another wheel. Specifically, a frictional engagement portion may be provided between oscillating weight wheel 16 and oscillating wheel spindle 21 or between rotor pinion **18*a* and rotor magnet 18*b*. The level of the frictional force in these cases would also depend on the gear ratio of each case. In the case of oscillating wheel 16, the level of friction force needs to be higher than the unbalanced torque of oscillating weight 15, whereas in the case of rotor pinion 18*a*,** the level of the friction force may be further lowered by an amount corresponding to the gear ratio of the pinion provided on the rotor spindle to the transmission gear wheel. Additionally, the structure which includes a frictional force couple is not necessarily limited to the above gear wheel spindle arrangement but may be employed in various other structures. For example, a known cannon pinion method which is used as a slip mechanism for a minute wheel or a structure which employs magnetic force from a magnet may be utilized.

Figure 8:
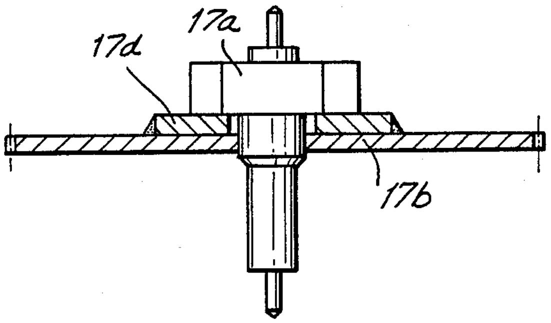
FIG. 8 is a sectional view of a transmission wheel constructed in accordance with an alternative embodiment of the present invention.

Reference is made to FIG. 8 in which a magnet employed to act as the frictional component is provided. In this embodiment, transmission wheel spindle **17*a* of transmission wheel 17 is constructed of a magnetic material. A magnet 17*d* is rigidly secured to wheel gear 17*b* and wheel gear 17*b* is loosely engaged with wheel spindle 17*a* so that they can rotate relative to each other. Wheel gear 17*b* is secured to wheel spindle 17*a* by the attractive force acting between magnet 17*d* and spindle 17*a*. When the force transmitted by oscillating weight 15 is weaker than the attractive force between wheel spindle 17*a* and magnet 17*d* transmission wheel 17 rotates as a single unit. However, when the force transmitted from oscillating weight 15 is greater than the attractive force between wheel spindle 17*a* and wheel gear 17*b*, wheel spindle 17*a* races relative to wheel gear 17*b*, wheel gear 17*a* races relative to gear 17*b*.** If this structure is applied to a generator rotor, the magnet may also serve as a rotor magnet.

Accumulator 300 includes a capacitor 2 provided in a recessed portion **1*a* of main plate 1. A lead plate 23 is provided at the obverse side of capacitor 2. A ring shaped capacitor holder 24 presses against lead plate 23 to retain capacitor 2 in place. An insulating plate 25 is provided between ring shaped capacitor holder 24 and insulating plate 25. Capacitor holder 24 is rigidly secured to main plate 1 by screws 26 and 27**.

A pattern **28*a* provided on circuit board 28 is clamped between lead plate 23 and main plate 1 to provide an electrical connection with a negative electrode of capacitor 2. A positive electrode of capacitor 2 is electrically connected with a positive lead 39 which is electrically connected with circuit board pattern 28 by bringing positive lead 39 into resilient contact with the side of capacitor 2**.

Circuit board 28 is formed of a flexible board serving as a base for an IC chip 30, a diode 31, capacitor 32 provided for boosting the voltage, an auxiliary capacitor 33 and a crystal oscillator 34 rigidly secured to the surface of circuit board 28. Each of these elements faces main plate 1 and is interconnected through electrode pattern **28*a* formed on circuit board 28**.

An end portion **28*b* of circuit board 28 includes a pattern which is connected to a pattern on a coil lead board 20*a* provided on generator coil block 20. The circuit board pattern is pressed against coil lead board pattern 20*a* by a screw 35 to come into electrical contact with each other. Pattern 20*a* formed at a second end 28*c* of circuit board 28 projects from circuit board 28*a* and serves as a connection with capacitor 2. Circuit board 28 also includes a relief bore 28*d* for receiving watch coil block 3. Crystal oscillator 34 is also received within bore 28*d* intermediate coil block 3 and circuit board 28 thereby minimizing thickness of watch 110. A pattern connects the watch circuitry above with a pattern of coil lead board 3*a* provided on watch coil block 3 is formed at the periphery of board 28*d*. Circuit board pattern 28*a* and coil lead board pattern 3*a* are pressed together by screw 36** to form an electric contact.

The components rigidly secured on circuit board 28 such as IC chip 30, diode 31, capacitor 32, auxiliary capacitor 33 and crystal oscillator 34 are received within respective recesses formed in plastic main plate 1, protecting these components while also minimizing wristwatch thickness. Further, circuit board 28 is formed in a dispersed manner so that it does not overlap indicating wheel train 100 or the power transmission wheel train, again minimizing wristwatch thickness.

A circuit press plate 29 formed from a metal sheet is mounted on the obverse side of circuit board 28. Circuit board 29 is disposed between circuit board 28 and screws 35, 36, 26 and a screw 38 which secures coil block 3 in place so that circuit press plate 29 is rigidly secured to main plate 1 by screws 26, 35, 36 and 38. Circuit press plate 29 is formed with spring portions 29*a*, and 29*b* for pressing circuit board 28 at peripheral portions of main plate 1 so that circuit board 28 will not interfere with the locus of oscillating weight 15. A spring portion 29*c* presses a setting lever for positioning a winding stem formed in the vicinity of screw 38. Circuit board 28 includes a board formed in facing relationship with spring 29*c*. A spring 29*d* presses crystal oscillator 34 against main plate 1 while a spring 29*e* contacts the casing to provide a ground connection. As spring 29*e* is provided at the side of watch 110 to prevent spring 29*e* from interfering with the locust of oscillating weight 15.

The positioning of indicating wheel train 100, step motor 200, accumulator 300 generator 400 and circuit board 28 will now be described. Indicating wheel train 100 includes permanent magnet rotor 5, intermediate wheel 6, second wheel 7 and third wheel 8. The power transmission wheel train includes transmission wheel 17 and permanent magnet motor 18. These elements along with watch coil block 3, generator coil block 20, capacitor 2 and circuit board 28 are disposed in dispersed pattern about watch 110 so that these elements do not overlap each other if viewed from the obverse side of watch 110. Additionally, electric elements provided on circuit board 28 are received within respective recesses formed in main plate 1 minimizing watch thickness. Crystal oscillator 34 is disposed in unused space adjacent watch coil 3 thereby effectively utilizing this space and enabling the overall mechanical structure of watch 110 with the exception of oscillating weight 15 to be formed in a substantially flat shape.

Oscillating weight 15 includes a peripheral thick wall portion 15*c* provided at the outer peripheral portion of main plate 1 beyond coils 20 and 3 so that peripheral portion 15*c* is coplanar with both coil 3 and coil 20. Therefore, the clearance between oscillating weight 15 and oscillating weight bridge 13 can be minimized making it possible to provide an electronic watch comparable to conventional watches in term of overall thickness even though watch 110 utilizes an oscillating weight as a power mechanism. Additionally, because the heaviest portion, thick wall portion 15*c* is provided at the periphery of watch 110 it is possible to provide an electronic wristwatch having a generator which has a high generation efficiency.

Figure 6:
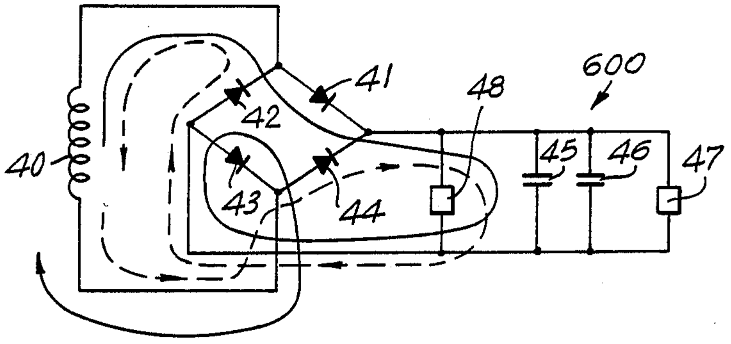
FIG. 6 is a schematic diagram of a generating circuit employed in the electronic wristwatch constructed in accordance with the present invention.
Figure 7:
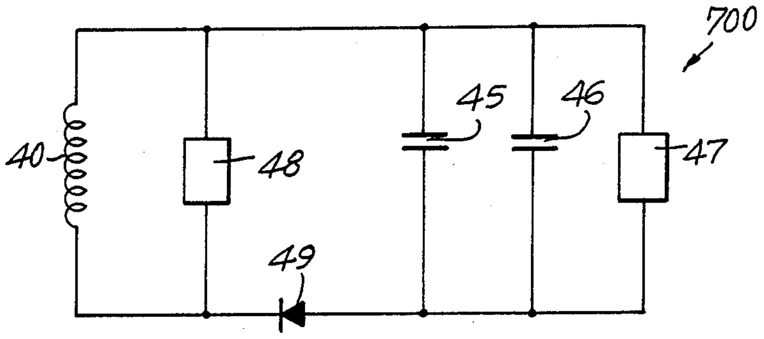
FIG. 7 is a schematic diagram of an alternative embodiment of a generating circuit utilized in the electronic wristwatch of the present invention.

Reference is now made to FIGS. 6 and 7 in which generator circuits which may be utilized in watch 110 are provided. Reference is first made to FIG. 6 in which a full wave rectifier circuit, generally indicated at 600, is provided. Diodes 41, 42, 43 and 44 form a diode bridge for full wave rectification connected to a coil 40 which acts as the generator. A capacitor 45 for voltage accumulation is connected to diodes 41, 42, 43 and 44. An auxiliary capacitor 46 having a smaller capacitance than capacitor 45 is connected in parallel to capacitor 45. Auxiliary capacitor 46 is charged with the charge from accumulator capacitor 45. A watch circuit 47 provided in parallel to capacitors 45 and 46 is driven by the output of auxiliary capacitor 46. As oscillating weight 15 oscillates in a first direction, a current flows through circuit 600 in a direction shown by the solid line. On the other hand, as osoillating weight 15 oscillates in the opposite direction, a current flows through circuit 600 as shown by the dashed line. This results in charging of capacitors 45 and 46 in either direction of oscillation for oscillating weight 15. A limiter 48 provided in parallel with capacitor 55 detects the charged level of capacitor 45 and when an overcharged state is detected limiter 48 shorts the ends of coil 40 preventing capacitor 45 from being further charged.

Reference is now being made to FIG. 7 in which a half wave rectifier circuit, generally indicated at 700 is provided. Circuit 700 is similar to circuit 600, however, diodes 41–44 have been removed so that limiter 48 is directly connected in parallel with coil 40. A single diode 49 between limiter 48 and capacitor 45 acts to rectify the current. Because the number of diodes is reduced, the resistance is correspondingly reduced so that it is possible to realize more efficient charging. To more effectively utilize the voltage accumulated in capacitor 45, it is possible to insert a booster circuit between capacitor 45 and auxiliary capacitor 46. A specific arrangement thereof is provided in the inventor's copending U.S. patent application Ser. No. 06/849,932.

By providing an electronic wristwatch having a generator therein arranged for converting mechanical energy obtained from an oscillating weight into electrical energy which includes a friction coupling within a power transmission train which slips when torque applied by the oscillating weight reaches too high a value, a wristwatch more resistant to sharp impact and damage is provided. Additionally, by providing the elements of the wristwatch arranged in a dispersed pattern about the watch, an electronic wristwatch having a generator may be provided having a minimum thickness.

It will thus be seen that the objects set forth above, among those made apparent from the preceding description, are efficiently attained and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

What is claimed is:

1. An electronic wristwatch having an electric generator therein, the generator converting mechanical energy to electrical energy for driving the electronic wristwatch comprising mechanical energy means for producing mechanical energy; power transmission means for transmitting said mechanical energy to said generator by applying a torque to said generator; and limiting means for preventing mechanical energy transmission through said power transmission means when the torque to be applied to said generator exceeds a predetermined value and allowing said mechanical energy transmission through said power transmission means when said torque to be applied to said generator is less than or equal to the predetermined value.

2. The electronic wristwatch of claim 1, wherein said mechanical means includes an oscillating weight.

3. The electronic wristwatch of claim 2, wherein said power transmission means includes a wheel train connected to said oscillating weight.

4. The electronic wristwatch of claim 3, wherein said wheel train includes a plurality of wheels, at least one of said wheels comprising a wheel gear and a wheel spindle, said wheel gear being connected to said wheel spindle by a friction fit.

5. The electronic wristwatch of claim 4, wherein one of said wheels is a transmission wheel having a transmission wheel gear and a transmission wheel spindle, the transmission wheel gear being formed to receive said transmission wheel spindle therein and having at least two resilient arms extending across an inner diameter of the transmission wheel gear to provide a friction fit between the resilient arms and the transmission wheel spindle.

6. The electronic wristwatch of claim 2, wherein said generator includes a permanent magnet rotor, a stator surrounding said permanent magnet rotor and a coil disposed so as not to overlap said rotor and said wheel train meshing with said rotor.

7. The electronic wristwatch of claim 6, wherein said stator is formed as a unitary piece having a bore formed therein, said rotor being disposed within said bore.

8. The electronic wristwatch of claim 7, wherein said limiting means includes said rotor, said rotor having a first part and a second part, said first part being connected to said second part by a friction fit so that the first part slips relative to the second part when the torque to be applied to said generator exceeds a predetermined value.

9. The electronic wristwatch of claim 4, wherein one of said wheels is a transmission wheel, the transmission wheel including a transmission wheel gear and a transmission wheel spindle, the transmission wheel spindle being constructed of a magnetic material, a magnet rigidly secured to the wheel gear and the wheel gear loosely engaging with the wheel spindle whereby the wheel gear is secured to the wheel spindle by the attractive force between the magnet and the transmission wheel spindle.

10. The electronic wristwatch of claim 4, wherein said wheel train includes a transmission wheel gear and a transmission wheel spindle, said transmission wheel spindle being fixed to said transmission wheel gear by a friction fit, said limiting means including said transmission wheel whereby the transmission wheel spindle slips relative to said transmission wheel gear when the torque to be applied to said generator exceeds a predetermined value.

11. The electronic wristwatch of claim 1, further comprising circuit means for driving said electronic wristwatch when said oscillating weight moves in either of a first direction or a second direction opposite to said first direction.

12. The electronic wristwatch of claim 11, wherein said circuit means includes a diode bridge and capacitor.

13. An electronic wristwatch having an electric generator therein, the generator converting mechanical energy to electric energy for driving the electronic wristwatch comprising an oscillating weight for producing mechanical energy, a wheel train for transmitting said mechanical energy to said generator by applying a torque to said generator, the wheel train including a transmission wheel having a transmission pinion and a transmission gear wheel, the transmission pinion being affixed to said transmission gear wheel by a friction fit for preventing mechanical energy transmission through said wristwatch when the torque to be applied to said generator exceeds a predetermined value and allowing said mechanical energy transmission when said torque to be applied to said generator is less than or equal to the predetermined value.

14. The electronic wristwatch of claim 13, wherein said generator includes a rotor and a coil magnetically connected to said rotor to generate an induced voltage in response to a rotation of said rotor, said oscillating weight being pivotably supported at the center of said wristwatch and having an outer peripheral portion disposed coplanar with said coil and outside said coil relative to a center of said wristwatch.

15. The electronic wristwatch of claim 14, wherein said oscillating weight is formed with a thick wall portion, said thick wall portion being disposed at said outer peripheral portion.

16. An electronic wristwatch having an electric generator therein, the generator converting mechanical energy to electrical energy for driving the electronic wristwatch comprising an oscillating weight for producing mechanical energy; a wheel train for transmitting mechanical energy from said oscillating weight to said generator; said generator including a permanent magnet rotor driven by said wheel train, a substantially planar plate type stator having an opening formed therein, said rotor being positioned in said opening, a coil magnetically connected to said stator for generating an induced voltage in response to rotation of said rotor, said wheel train and said coil being disposed so as not to overlap in plan view, said oscillating weight being pivotably supported at the center of said wristwatch and having an outer peripheral portion disposed coplanar with said coil and outside of said coil relative to the center of said wristwatch.

17. The electronic wristwatch of claim 16, wherein said wheel train includes an oscillating weight wheel integrally formed with said oscillating weight and a transmission wheel, said transmission wheel meshing with said oscillating weight wheel.

18. The electronic wristwatch of claim 16 further comprising a spring portion to ground said wristwatch, said spring forming a ground at a distance from said oscillating weight.

19. An electronic wristwatch having an electric generator therein, the generator converting mechanical energy to electrical energy for driving said electronic wristwatch comprising a main plate; an oscillating weight for producing mechanical energy pivotably mounted on one side of the main plate; an indicating wheel train for controlling the display of said wristwatch, a step motor including a rotor, a stator and a coil for driving said indicating wheel train; a transmission wheel train for transmitting said mechanical energy to said generator by applying a torque to said generator; said generator including a permanent magnet rotor rotated by said transmission wheel train and a generator coil magnetically coupled to said permanent magnet rotor to generate an induced voltage in response to rotation of said rotor; and a circuit board arranged to output a signal for driving said step motor and control the output from said generator coil, said indicating wheel train, said transmission wheel train, said coil, said generator coil and said circuit board being disposed within said wristwatch in a dispersed pattern so that these elements do not substantially overlap each other in plan view and said oscillating weight being pivotably disposed on the obverse side of said main plate.

20. The electronic wristwatch of claim 19, wherein said circuit board is flexible.

21. The electronic wristwatch of claim 20, further comprising electric elements for controlling and driving said wristwatch, wherein said electric elements are rigidly connected to the surface of said flexible circuit board which faces said main plate, said main plate being formed with recesses for receiving said electric elements.

22. The electronic wristwatch of claim 21, further comprising a circuit press plate for pressing said flexible circuit board against said main plate.

23. The electronic wristwatch of claim 22, wherein said circuit press plate is formed from a metal sheet.

* * * * *